Nov. 10, 1931.　　　　E. PERTZ　　　　1,831,320
APPARATUS FOR THE DETERMINATION OF THE DAMPING CAPACITY OF MATERIALS
Filed March 10, 1928
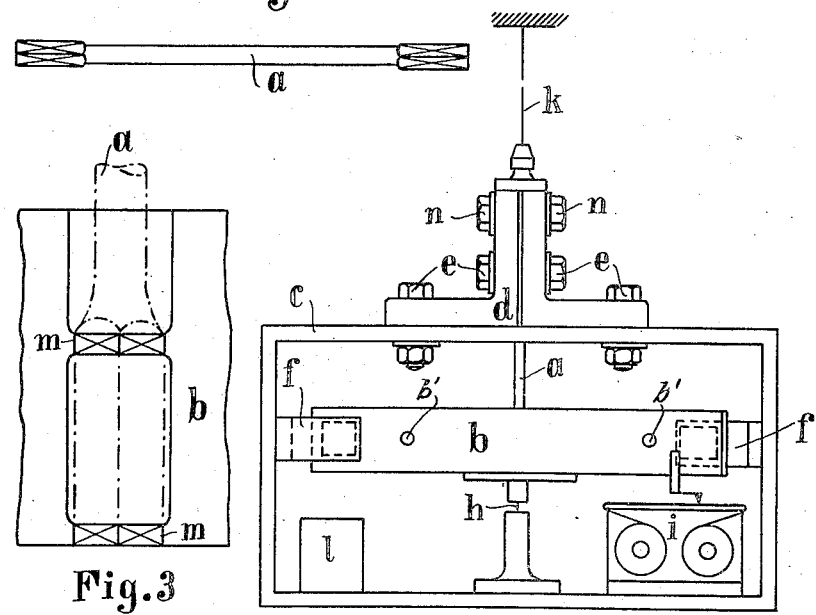
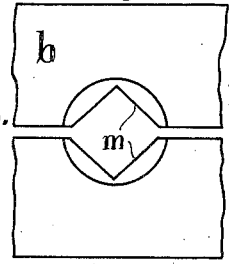
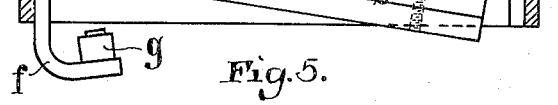
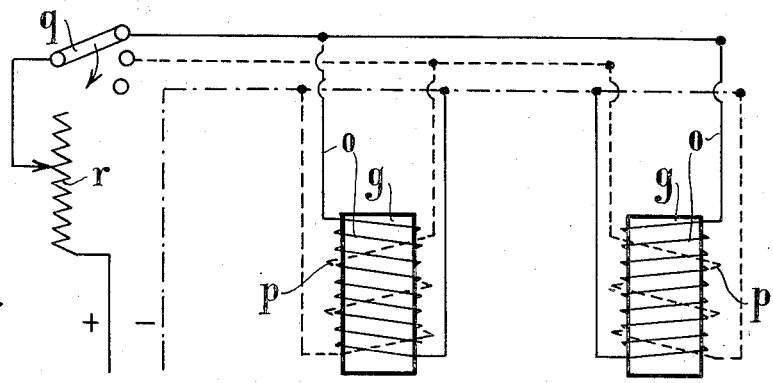
Inventor:
Ewald Pertz
by his attorney Patented Nov. 10, 1931

1,831,320

UNITED STATES PATENT OFFICE

EWALD PERTZ, OF BLAUKREUZHOF, NEAR DINKER, GERMANY

APPARATUS FOR THE DETERMINATION OF THE DAMPING CAPACITY OF MATERIALS

Application filed March 10, 1928, Serial No. 260,767, and in Germany March 22, 1927.

It is well known how to infer from the dying away of the torsional oscillations of a rod the damping capacity of the constructional material in question. A test rod is at one end secured in a block and provided at the other end with an oscillatory mass. The oscillatory mass is now twisted about the axis of the rod and suddenly released. The energy stored in the rod brings about an oscillatory movement of the arrangement and decreases in consequence of the internal losses in the constructional material (internal damping) and of the external losses in the testing arrangement. From the decrease of the oscillatory deflection the magnitude of the total damping can be ascertained.

With the arrangements hitherto used entirely false results were however obtained. The determination of the constructional material damping by another method and a comparison of the oscillation results led to this fact. The basis of the invention is the recognition that the amounts of energy conducted externally assumed far too high values in the case of the arrangements hitherto customary. On account of the fastening of the attachment block to the foundation, the decline of a large portion of the energy was due to external losses thus caused. A further portion was destroyed by friction in the attachment on both sides of the rod. Finally the nature of the starting of the oscillatory motion was not without influence, since a mechanical release of the oscillatory mass by means of one or even two bolts situated opposite one another—on account of the simultaneity not being perfect—produced in the test rod a bending moment in addition to the rotary moment.

The invention consists in the feature that this loss of energy has been reduced, by suitably constructing the attachments, to amounts which are small compared with the constructional material damping. This attachment to be made according to the invention relates to the formation of the foundation, the connection of the test rod with the masses and the securing of the oscillatory mass before the starting of the oscillatory motion.

In the accompanying drawings,—

Fig. 1 is a view of the test rod employed.
Fig. 2 is a view of the same mounted in the test apparatus.
Fig. 3 is a fragmentary view of one section of the oscillatory mass, illustrating the mounting of the rod therein.
Fig. 4 is a fragmentary top view of the oscillatory mass.
Fig. 5 is a section through the apparatus.
Fig. 6 is a diagram of the electric circuit.

A rod $a$ (Fig. 1) having a circular cross-section is made from the constructional material to be tested, and the enlarged ends of the same are formed as squares. At one end the test rod carries the oscillatory mass $b$ and at the other end the counter-mass $c$, which is in the shape of a frame made from strong flat iron surrounding the rod and the oscillatory mass (Fig. 2). The securing of the rod and frame is effected with the aid of an attachment head $d$. It is arranged on the frame revolubly about the axis of the rod and renders possible within a certain range any desired setting of the oscillatory mass relatively to the frame. The desired setting of the attachment head $d$ is secured by means of the bolts $e$. The frame carries on two bent members $f$ electromagnets $g$, against which the oscillatory mass $b$ rests when the rod $a$ is twisted. In each case the setting of the attachment head $d$ on the frame $c$ determines the magnitude of the deformation of the rod. In order to avoid bending-oscillations, the free end of the rod is guided by a pivot $h$ of very small diameter. The dying down of the oscillatory motion is recorded by means of a writing apparatus $i$ with the aid of ink or other suitable means.

The prevention of the flow of energy into the foundations is effected by suspending the whole testing arrangement with the aid of one or more wires $k$. The place of attachment is situated on the attachment head $d$ in the direction of the axis of the rod. Consequently the damping reaction of the ground which occurs in the case of a fixed arrangement is done away with; the oscillatory mass and frame oscillate relatively to one another and do not conduct any energy away. The deformation of the wire occurring during the oscillation is extremely slight and is in the purely elastic domain. In order that the axis of twisting and the axis of the rod may coincide the machine is balanced statically and dynamically by means of the mass $l$.

In order to avoid energy losses in the rod attachments, it is necessary for the connection of the rod with the masses to take place suddenly and on a short stretch. In the case of the customary wedge-connections or square-connections small movements occur in the attachment between the rod and the masses, which movements are allied with friction and consequently consume energy. An attachment according to the invention is obtained by the square ends of the test rod $a$ being each grasped by two narrow ledges $m$ and by the bolts $n$ being tightened with great force. The oscillatory mass itself is formed in two parts. By drawing the two parts together as by means of screws $b'$ the test rod is clamped fast in the bars.

The release of the torsion is effected electromagnetically (Fig. 6) in order to avoid supplementary forces. After subjecting the rod to torsion the oscillatory mass $b$ is held fast by the magnets $g$ situated on the frame. By interrupting the magnet current the oscillatory mass is thus released at both ends at the same time. The centre of gravity of the machine moreover remains in the position of rest since disturbances caused during the release through mechanical engagement are avoided. For the purpose of doing away with the residual magnetism which has a disturbing effect on the oscillatory motion the magnets $g$ carry an additional counter-winding $p$ besides the main winding $o$. On the circuit of the main current being interrupted by means of the switch $q$ the counter-winding $p$ is effective for an instant. The current required by the magnets is regulated by means of a resistance $r$.

I claim:—

1. In an apparatus for the determination of internal friction or damping of materials under torsional oscillations in which the material to be tested is in the form of a test rod adapted to be placed under torsional strain, two masses of material adapted for oscillations relatively to each other and to be secured to the ends of the rod, means for supporting the apparatus so as to permit such relative oscillations of the masses of material, electrical means for holding the rod under torsional stress and releasing the same, and means for indicating the oscillatory deflections.

2. Apparatus according to claim 1, characterized by each mass being formed in two parts clamping about the rod, said parts and rod having angular clamping surfaces.

3. Apparatus according to claim 1, in which the oscillating members are held in stressed condition by electromagnets mounted on one of the members, and including a circuit having said magnets therein, and means for energizing and de-energizing the magnets as well as means for eliminating residual magnetism.

4. In an apparatus for the determination of internal friction or damping of materials under torsional oscillations in which the material to be tested is in the form of a test rod adapted to be placed under torsional strain, two masses of material adapted for oscillation relatively to each other and to be secured to the ends of the rod, means for supporting the apparatus so as to permit such relative oscillations of the masses of material, an electric circuit adapted to be energized and de-energized and including electromagnets for holding the rod under torsional stress and releasing the same, and means for indicating the oscillatory deflections.

5. In an apparatus for the determination of internal friction or damping of materials under torsional oscillations in which the material to be tested is in the form of a test rod adapted to be placed under torsional strain, two masses of material adapted for oscillation relatively to each other and to which the ends of the rod are secured, a suspending element for flexibly suspending the apparatus so as to permit such relative oscillations of the masses of material, and means for indicating the oscillatory deflections.

6. In an apparatus for the determination of internal friction or damping of materials under torsional oscillations in which the material to be tested is in the form of a test rod adapted to be placed under torsional strain, two masses of material adapted for oscillation relatively to each other and to which the ends of the rod are secured, means for supporting the apparatus so as to permit such relative oscillations of the masses of material, electrical means for holding the rod under torsional stress and releasing the same, means for statically and dynamically balancing the suspended apparatus, and means for indicating the oscillatory deflections.

In testimony whereof I affix my signature.

EWALD PERTZ.